United States Patent
Noguchi

(10) Patent No.: US 9,413,467 B2
(45) Date of Patent: Aug. 9, 2016

(54) OPTICAL TRANSMITTER, OPTICAL TRANSMISSION/RECEPTION SYSTEM, AND DRIVE CIRCUIT

(71) Applicant: NEC Corporation, Tokyo (JP)

(72) Inventor: Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 9 days.

(21) Appl. No.: 14/387,005

(22) PCT Filed: Nov. 6, 2012

(86) PCT No.: PCT/JP2012/007119
§ 371 (c)(1),
(2) Date: Sep. 22, 2014

(87) PCT Pub. No.: WO2013/140477
PCT Pub. Date: Sep. 26, 2013

(65) Prior Publication Data
US 2015/0063822 A1  Mar. 5, 2015

(30) Foreign Application Priority Data
Mar. 22, 2012  (JP) .................................. 2012-064767

(51) Int. Cl.
*H04B 10/50* (2013.01)
*H04B 10/556* (2013.01)
*G02F 1/01* (2006.01)
*G02F 1/225* (2006.01)
*H04B 10/27* (2013.01)

(52) U.S. Cl.
CPC .......... *H04B 10/5561* (2013.01); *G02F 1/0121* (2013.01); *G02F 1/2255* (2013.01); *H04B 10/27* (2013.01)

(58) Field of Classification Search
CPC .................................................. H04B 10/5051
See application file for complete search history.

(56) References Cited

U.S. PATENT DOCUMENTS

2004/0141222 A1* 7/2004 Miyazaki .............. G02F 1/0121
                                                                 359/237
2012/0251032 A1* 10/2012 Kato ...................... G02F 1/0327
                                                                 385/3

FOREIGN PATENT DOCUMENTS

| JP | 05-257102 | 10/1993 |
|----|-----------|---------|
| JP | 05-289033 | 11/1993 |
| JP | 07-13112  | 1/1995  |
| JP | 2007-082094 | 3/2007 |
| JP | 2012-073475 | 4/2012 |
| WO | 2011043047 | 4/2011 |
| WO | 2011043079 | 4/2011 |

OTHER PUBLICATIONS

Tomoaki Kato et al., "InP modulator with linear-accelerator-type tiny in-line centipede electrode structure for direct-drive with CMOS logic IC", IEICE Technical Report, Jun. 23, 2011, vol. 111, No. 111, pp. 59-64.

* cited by examiner

Primary Examiner — Shi K Li
(74) Attorney, Agent, or Firm — Young & Thompson

(57) ABSTRACT

An optical modulator includes optical waveguides on which phase modulation regions are formed. A drive circuit includes a lower-bit drive unit, an upper-bit drive unit, and a bit splitting unit. The bit splitting unit splits an input digital signal into upper bits and lower bits. The lower-bit drive unit outputs a value obtained by performing D/A conversion on the lower bits to phase modulation regions. The upper-bit drive unit outputs, to phase modulation regions, a value greater than a maximum value of values output from the lower-bit drive unit, or a minimum value of the values output from the lower-bit drive unit, according to a value of the upper bits.

18 Claims, 13 Drawing Sheets

| BINARY CODE | DAC51 | | DAC52 | | DAC53 | | DAC54 | | PHASE MODULATION AMOUNT (deg) | |
|---|---|---|---|---|---|---|---|---|---|---|
| | POSITIVE PHASE | NEGATIVE PHASE | POSITIVE PHASE | NEGATIVE PHASE | POSITIVE PHASE | NEGATIVE PHASE | POSITIVE PHASE | NEGATIVE PHASE | L1 | L2 |
| 0000 | 0 | 4 | 0 | 4 | 0 | 4 | 0 | 4 | 0 | 0 |
| 0001 | 1 | 3 | 0 | 4 | 0 | 4 | 0 | 4 | $\Delta\theta$ | $-\Delta\theta$ |
| 0010 | 2 | 2 | 0 | 4 | 0 | 4 | 0 | 4 | $2\Delta\theta$ | $-2\Delta\theta$ |
| 0011 | 3 | 1 | 0 | 4 | 0 | 4 | 0 | 4 | $3\Delta\theta$ | $-3\Delta\theta$ |
| 0100 | 4 | 0 | 0 | 4 | 0 | 4 | 0 | 4 | $4\Delta\theta$ | $-4\Delta\theta$ |
| 0101 | 4 | 0 | 1 | 3 | 0 | 4 | 0 | 4 | $5\Delta\theta$ | $-5\Delta\theta$ |
| 0110 | 4 | 0 | 2 | 2 | 0 | 4 | 0 | 4 | $6\Delta\theta$ | $-6\Delta\theta$ |
| 0111 | 4 | 0 | 3 | 1 | 0 | 4 | 0 | 4 | $7\Delta\theta$ | $-7\Delta\theta$ |
| 1000 | 4 | 0 | 4 | 0 | 0 | 4 | 0 | 4 | $8\Delta\theta$ | $-8\Delta\theta$ |
| 1001 | 4 | 0 | 4 | 0 | 1 | 3 | 0 | 4 | $9\Delta\theta$ | $-9\Delta\theta$ |
| 1010 | 4 | 0 | 4 | 0 | 2 | 2 | 0 | 4 | $10\Delta\theta$ | $-10\Delta\theta$ |
| 1011 | 4 | 0 | 4 | 0 | 3 | 1 | 0 | 4 | $11\Delta\theta$ | $-11\Delta\theta$ |
| 1100 | 4 | 0 | 4 | 0 | 4 | 0 | 0 | 4 | $12\Delta\theta$ | $-12\Delta\theta$ |
| 1101 | 4 | 0 | 4 | 0 | 4 | 0 | 1 | 3 | $13\Delta\theta$ | $-13\Delta\theta$ |
| 1110 | 4 | 0 | 4 | 0 | 4 | 0 | 2 | 2 | $14\Delta\theta$ | $-14\Delta\theta$ |
| 1111 | 4 | 0 | 4 | 0 | 4 | 0 | 3 | 1 | $15\Delta\theta$ | $-15\Delta\theta$ |

Fig. 3

| BINARY CODE | DAC1 POSITIVE PHASE | DAC1 NEGATIVE PHASE | DRV1 POSITIVE PHASE | DRV1 NEGATIVE PHASE | DRV2 POSITIVE PHASE | DRV2 NEGATIVE PHASE | DRV3 POSITIVE PHASE | DRV3 NEGATIVE PHASE | PHASE MODULATION AMOUNT (deg) L1 | PHASE MODULATION AMOUNT (deg) L2 |
|---|---|---|---|---|---|---|---|---|---|---|
| 0000 | 0 | 3 | 0 | 4 | 0 | 4 | 0 | 4 | 0 | 0 |
| 0001 | 1 | 2 | 0 | 4 | 0 | 4 | 0 | 4 | $\Delta\theta$ | $-\Delta\theta$ |
| 0010 | 2 | 1 | 0 | 4 | 0 | 4 | 0 | 4 | $2\Delta\theta$ | $-2\Delta\theta$ |
| 0011 | 3 | 0 | 0 | 4 | 0 | 4 | 0 | 4 | $3\Delta\theta$ | $-3\Delta\theta$ |
| 0100 | 0 | 3 | 4 | 0 | 0 | 4 | 0 | 4 | $4\Delta\theta$ | $-4\Delta\theta$ |
| 0101 | 1 | 2 | 4 | 0 | 0 | 4 | 0 | 4 | $5\Delta\theta$ | $-5\Delta\theta$ |
| 0110 | 2 | 1 | 4 | 0 | 0 | 4 | 0 | 4 | $6\Delta\theta$ | $-6\Delta\theta$ |
| 0111 | 3 | 0 | 4 | 0 | 0 | 4 | 0 | 4 | $7\Delta\theta$ | $-7\Delta\theta$ |
| 1000 | 0 | 3 | 4 | 0 | 4 | 0 | 0 | 4 | $8\Delta\theta$ | $-8\Delta\theta$ |
| 1001 | 1 | 2 | 4 | 0 | 4 | 0 | 0 | 4 | $9\Delta\theta$ | $-9\Delta\theta$ |
| 1010 | 2 | 1 | 4 | 0 | 4 | 0 | 0 | 4 | $10\Delta\theta$ | $-10\Delta\theta$ |
| 1011 | 3 | 0 | 4 | 0 | 4 | 0 | 0 | 4 | $11\Delta\theta$ | $-11\Delta\theta$ |
| 1100 | 0 | 3 | 4 | 0 | 4 | 0 | 4 | 0 | $12\Delta\theta$ | $-12\Delta\theta$ |
| 1101 | 1 | 2 | 4 | 0 | 4 | 0 | 4 | 0 | $13\Delta\theta$ | $-13\Delta\theta$ |
| 1110 | 2 | 1 | 4 | 0 | 4 | 0 | 4 | 0 | $14\Delta\theta$ | $-14\Delta\theta$ |
| 1111 | 3 | 0 | 4 | 0 | 4 | 0 | 4 | 0 | $15\Delta\theta$ | $-15\Delta\theta$ |

Fig. 7

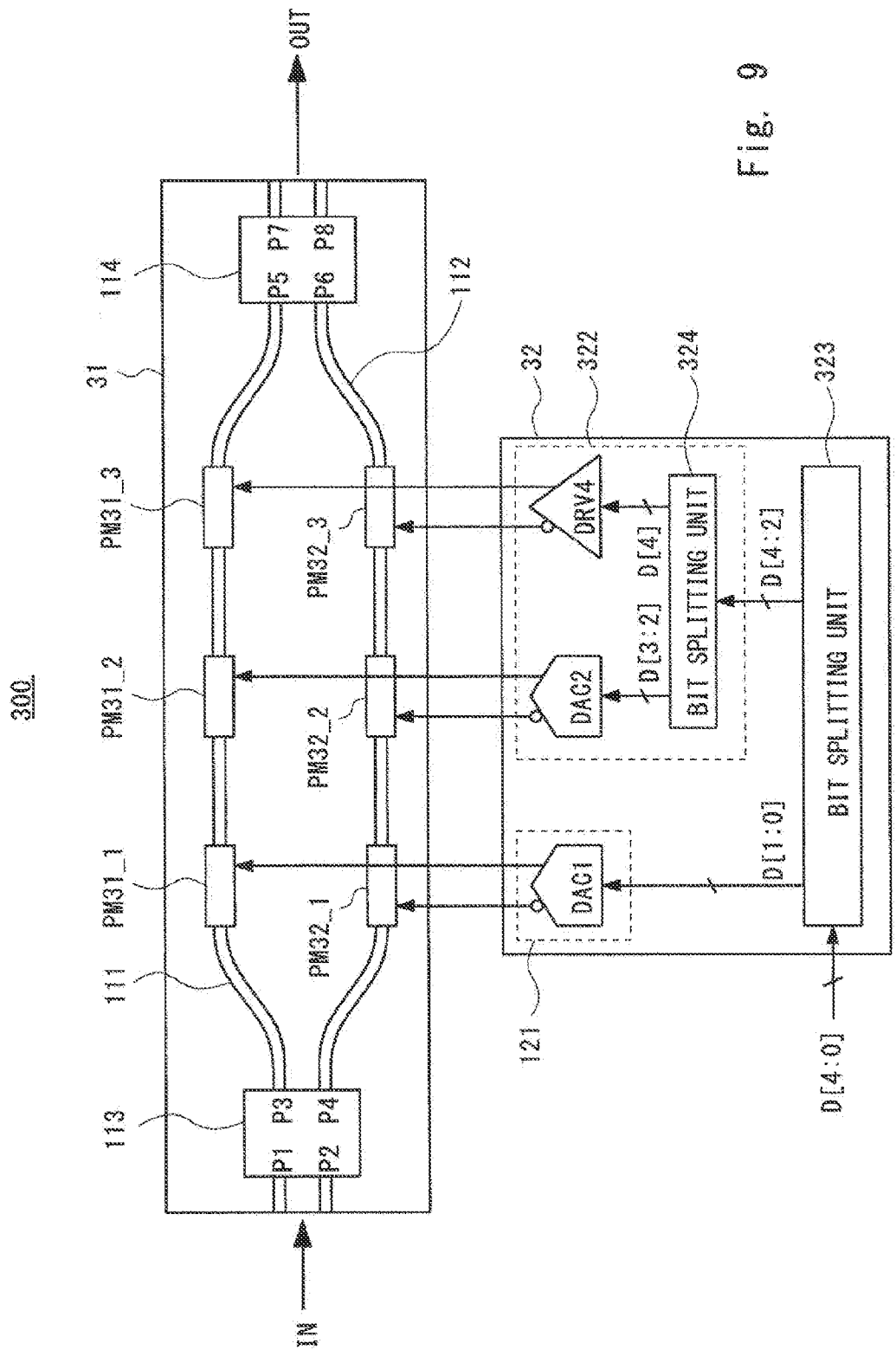

| BINARY CODE | DAC1 | | DAC2 | | DRV4 | | PHASE MODULATION AMOUNT (deg) | |
|---|---|---|---|---|---|---|---|---|
| | POSITIVE PHASE | NEGATIVE PHASE | POSITIVE PHASE | NEGATIVE PHASE | POSITIVE PHASE | NEGATIVE PHASE | L1 | L2 |
| 00000 | 0 | 3 | 0 | 12 | 0 | 16 | 0 | 0 |
| 00001 | 1 | 2 | 0 | 12 | 0 | 16 | $\Delta\theta$ | $-\Delta\theta$ |
| 00010 | 2 | 1 | 0 | 12 | 0 | 16 | $2\Delta\theta$ | $-2\Delta\theta$ |
| 00011 | 3 | 0 | 0 | 12 | 0 | 16 | $3\Delta\theta$ | $-3\Delta\theta$ |
| 00100 | 0 | 3 | 4 | 8 | 0 | 16 | $4\Delta\theta$ | $-4\Delta\theta$ |
| 00101 | 1 | 2 | 4 | 8 | 0 | 16 | $5\Delta\theta$ | $-5\Delta\theta$ |
| 00110 | 2 | 1 | 4 | 8 | 0 | 16 | $6\Delta\theta$ | $-6\Delta\theta$ |
| 00111 | 3 | 0 | 4 | 8 | 0 | 16 | $7\Delta\theta$ | $-7\Delta\theta$ |
| 01000 | 0 | 3 | 8 | 4 | 0 | 16 | $8\Delta\theta$ | $-8\Delta\theta$ |
| 01001 | 1 | 2 | 8 | 4 | 0 | 16 | $9\Delta\theta$ | $-9\Delta\theta$ |
| 01010 | 2 | 1 | 8 | 4 | 0 | 16 | $10\Delta\theta$ | $-10\Delta\theta$ |
| 01011 | 3 | 0 | 8 | 4 | 0 | 16 | $11\Delta\theta$ | $-11\Delta\theta$ |
| 01100 | 0 | 3 | 12 | 0 | 0 | 16 | $12\Delta\theta$ | $-12\Delta\theta$ |
| 01101 | 1 | 2 | 12 | 0 | 0 | 16 | $13\Delta\theta$ | $-13\Delta\theta$ |
| 01110 | 2 | 1 | 12 | 0 | 0 | 16 | $14\Delta\theta$ | $-14\Delta\theta$ |
| 01111 | 3 | 0 | 12 | 0 | 0 | 16 | $15\Delta\theta$ | $-15\Delta\theta$ |
| 10000 | 0 | 3 | 0 | 12 | 16 | 0 | $16\Delta\theta$ | $-16\Delta\theta$ |
| 10001 | 1 | 2 | 0 | 12 | 16 | 0 | $17\Delta\theta$ | $-17\Delta\theta$ |
| 10010 | 2 | 1 | 0 | 12 | 16 | 0 | $18\Delta\theta$ | $-18\Delta\theta$ |
| 10011 | 3 | 0 | 0 | 12 | 16 | 0 | $19\Delta\theta$ | $-19\Delta\theta$ |
| 10100 | 0 | 3 | 4 | 8 | 16 | 0 | $20\Delta\theta$ | $-20\Delta\theta$ |
| 10101 | 1 | 2 | 4 | 8 | 16 | 0 | $21\Delta\theta$ | $-21\Delta\theta$ |
| 10110 | 2 | 1 | 4 | 8 | 16 | 0 | $22\Delta\theta$ | $-22\Delta\theta$ |
| 10111 | 3 | 0 | 4 | 8 | 16 | 0 | $23\Delta\theta$ | $-23\Delta\theta$ |
| 11000 | 0 | 3 | 8 | 4 | 16 | 0 | $24\Delta\theta$ | $-24\Delta\theta$ |
| 11001 | 1 | 2 | 8 | 4 | 16 | 0 | $25\Delta\theta$ | $-25\Delta\theta$ |
| 11010 | 2 | 1 | 8 | 4 | 16 | 0 | $26\Delta\theta$ | $-26\Delta\theta$ |
| 11011 | 3 | 0 | 8 | 4 | 16 | 0 | $27\Delta\theta$ | $-27\Delta\theta$ |
| 11100 | 0 | 3 | 12 | 0 | 16 | 0 | $28\Delta\theta$ | $-28\Delta\theta$ |
| 11101 | 1 | 2 | 12 | 0 | 16 | 0 | $29\Delta\theta$ | $-29\Delta\theta$ |
| 11110 | 2 | 1 | 12 | 0 | 16 | 0 | $30\Delta\theta$ | $-30\Delta\theta$ |
| 11111 | 3 | 0 | 12 | 0 | 16 | 0 | $31\Delta\theta$ | $-31\Delta\theta$ |

Fig. 10

OPTICAL TRANSMITTER, OPTICAL TRANSMISSION/RECEPTION SYSTEM, AND DRIVE CIRCUIT

TECHNICAL FIELD

The present invention relates to an optical transmitter, an optical transmission/reception system, and a drive circuit, and more particularly, to an optical transmitter, an optical transmission/reception system, and a drive circuit, which perform multilevel modulation.

BACKGROUND ART

With an explosive increase in demand of a broadband multimedia communication service such as the Internet or a high-definition digital TV broadcast, a dense wavelength-division multiplexing optical fiber communication system, which is suitable for a long-distance and large-capacity transmission and is highly reliable, has been introduced in trunk line networks and metropolitan area networks. In access networks, an optical fiber access service spreads rapidly. In such an optical fiber communication system, cost reduction for laying optical fibers as optical transmission lines and improvement of spectral efficiency per optical fiber are important. Therefore, a wavelength-division multiplexing technology which multiplexes multiple optical signals having different wavelengths is widely used.

In an optical transmitter for such a high-capacity wavelength-division multiplexing communication system, an optical modulator is required. In the optical modulator, high speed operation with small wavelength dependence is indispensable. Further, an unwanted optical phase modulation component which degrades the waveform of the received optical signal after long-distance transmission (in the case of using optical intensity modulation as a modulation method), or an optical intensity modulation component (in the case of using optical phase modulation as a modulation method) should be suppressed as small as possible. A Mach-Zehnder (MZ) optical intensity modulator in which waveguide-type optical phase modulators are embedded into an optical waveguide-type MZ interferometer is suitable for such a use.

To increase the transmission capacity per wavelength channel, a multilevel optical modulation signal system having a smaller optical modulation spectrum bandwidth than a typical binary optical intensity modulation system is advantageous in terms of the spectral efficiency, wavelength dispersion of an optical fiber, and resistance to polarization mode dispersion, each of which poses a problem. This multilevel optical modulation signal system is considered to become mainstream particularly in optical fiber communication systems in trunk line networks exceeding 40 Gb/s, the demand for which is expected to increase in the future. For such use, a monolithically integrated multilevel IQ optical modulator in which two MZ optical intensity modulators described above and an optical multiplexer/demultiplexer are used in combination has recently been developed.

In high speed optical modulation by using this optical modulator, especially in the high-frequency region in which the frequency of a modulation electric signal is over 1 GHz, the propagating wavelength of the modulation electric signal becomes not negligibly short compared with the length of an electrode formed in an optical phase modulator region in the optical modulator. Therefore, voltage distribution of the electrode serving as means for applying an electric field to the optical phase modulator is no longer regarded as uniform in an optical signal propagation axis direction. To estimate optical modulation characteristics exactly, it is required to treat the electrode as a distributed constant line and treat the modulation electric signal propagating through the optical phase modulator region as a traveling-wave, respectively. In that case, in order to increase the effective interaction length with the modulated optical signal and the modulation electric signal, a so-called traveling-wave type electrode which is devised to make a phase velocity $v_o$ of the modulated optical signal and a phase velocity $v_m$ of the modulation electric signal as close to each other as possible (phase velocity matching) is required.

An optical modulator module having a segmented electrode structure to realize the traveling-wave type electrode and the multilevel optical modulation signal system has already been proposed (Patent Literature 1 to 4). An optical modulator module capable of performing multilevel control of a phase variation of a modulated optical signal in each segmented electrode has also been proposed. This optical modulator module is a compact, broad-band, and low-drive-voltage optical modulator module capable of generating any multilevel optical modulation signal, while maintaining phase velocity matching and impedance matching, which are required for a traveling-wave structure operation, by inputting a digital signal.

CITATION LIST

Patent Literature

Patent Literature 1: Japanese Unexamined Patent Application Publication No. H07-13112
Patent Literature 2: Japanese Unexamined Patent Application Publication No. H05-289033
Patent Literature 3: Japanese Unexamined Patent Application Publication No. H05-257102
Patent Literature 4: International Patent Publication No. WO 2011/043079

SUMMARY OF INVENTION

Technical Problem

However, the present inventor has found that the above-mentioned optical modulator module has the following problem. In theory, in the segmented electrode structure, value multiplexing corresponding to the number of segmented electrodes can be achieved by increasing the number of segmented electrodes. However, the number of segmented electrodes mountable on the optical modulator module to be actually prepared is limited depending on the size of the optical modulator. Accordingly, the number of levels of the multilevel modulation is limited in practice.

In this regard, the signal to be applied to each segmented electrode can be multileveled. A driving signal may be supplied to each segmented electrode by a multilevel D/A converter that outputs an analog signal according to an input digital signal. However, this technique requires a number of multilevel D/A converters corresponding to the number of segmented electrodes. In general, when a large number of multilevel D/A converters having a large circuit size are mounted on an optical transmitter, the size of the optical transmitter itself increases, which leads to an increase in cost.

The present invention has been made in view of the above-mentioned problem, and an object of the present invention is to provide an optical transmitter, an optical transmission/ reception system, and a drive circuit, which are capable of higher-order multilevel modulation with a small-scale circuit configuration.

Solution to Problem

An optical transmitter according to an exemplary aspect of the present invention includes: an optical modulator including an optical transmission line through which an optical signal propagates, a plurality of phase modulation regions being formed on the optical transmission line; and a drive circuit that outputs a driving signal to each of the plurality of phase modulation regions according to an input digital signal. The drive circuit includes: a bit splitting unit that splits the input digital signal into upper bits and lower bits; a lower-bit drive unit that outputs, as a driving signal, a value obtained by performing D/A conversion on the lower bits, to a first phase modulation region of the plurality of modulation regions; and an upper-bit drive unit that outputs, to a phase modulation region different from the first phase modulation region, a value greater than a maximum value of the driving signal output from the lower-bit drive unit, or a minimum value of the driving signal output from the lower-bit drive unit, as a driving signal, according to a value of the upper bits.

An optical transmission/reception system according to another exemplary aspect of the present invention includes: an optical transmitter that sends an optical signal; a transmission line through which the optical signal propagates; and an optical receiver that receives the optical signal via the transmission line. The optical transmitter includes: an optical modulator including an optical transmission line through which an optical signal propagates, a plurality of phase modulation regions being formed on the optical transmission line; and a drive circuit that outputs a driving signal to each of the plurality of phase modulation regions according to an input digital signal. The drive circuit includes: a bit splitting unit that splits the input digital signal into upper bits and lower bits; a lower-bit drive unit that outputs, as a driving signal, a value obtained by performing D/A conversion on the lower bits, to a first phase modulation region of the plurality of modulation regions; and an upper-bit drive unit that outputs, to a phase modulation region different from the first phase modulation region, a value greater than a maximum value of the driving signal output from the lower-bit drive unit, or a minimum value of the driving signal output from the lower-bit drive unit, as a driving signal, according to a value of the upper bits.

A drive circuit according to still another exemplary aspect of the present invention includes: a bit splitting unit that splits an input digital signal into upper bits and lower bits; a lower-bit drive unit that outputs, as a driving signal, a value obtained by performing D/A conversion on the lower bits, to a first phase modulation region of a plurality of modulation regions formed on an optical transmission line through which an optical signal propagates, the optical transmission line being formed in an optical modulator; and an upper-bit drive unit that outputs, to a phase modulation region different from the first phase modulation region, a value greater than a maximum value of the driving signal output from the lower-bit drive unit, or a minimum value of the driving signal output from the lower-bit drive unit, as a driving signal, according to a value of the upper bits.

Advantageous Effects of Invention

According to the present invention, it is possible to provide an optical transmitter, an optical transmission/reception system, and a drive circuit, which are capable of higher-order multilevel modulation with a small-scale circuit configuration.

BRIEF DESCRIPTION OF DRAWINGS

FIG. 3 is an operation table showing operations of the optical transmitter 500;

FIG. 7 is an operation table showing operations of the optical transmitter 100 according to the first exemplary embodiment;

FIG. 9 is a block diagram schematically showing a configuration of an optical transmitter 300 according to a third exemplary embodiment;

FIG. 10 is an operation table showing operations of the optical transmitter 300 according to the third exemplary embodiment.

DESCRIPTION OF EMBODIMENTS

Figure 1:
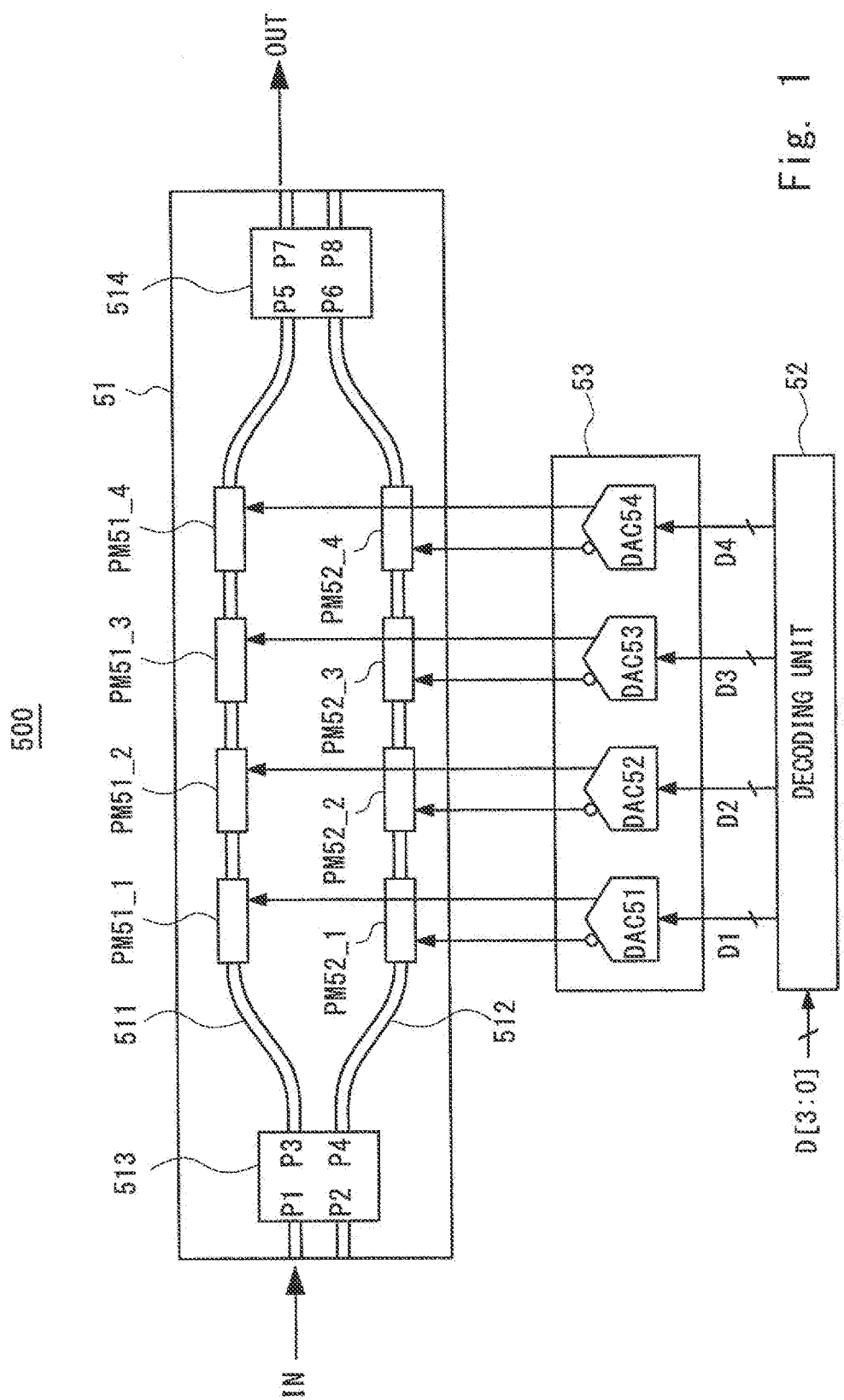
FIG. 1 is a block diagram schematically showing a configuration of a multilevel optical transmitter 500 having a typical segmented electrode structure.

Exemplary embodiments of the present invention will be described below with reference to the drawings. In the drawings, the same elements are denoted by the same reference numerals, and a redundant explanation is omitted as needed.

As a prerequisite for understanding the configuration and operation of each optical transmitter according to exemplary embodiments described below, a multilevel optical transmitter 500 having a typical segmented electrode structure will be described. The optical transmitter 500 is a multilevel modulation optical transmitter. In this case, however, to simplify the explanation, the optical transmitter 500 will be described as a 4-bit optical transmitter. FIG. 1 is a block diagram schematically showing the configuration of the multilevel optical transmitter 500 having a typical segmented electrode structure. The optical transmitter 500 includes an optical modulator 51, a decoder 52, and a drive circuit 53.

The optical modulator 51 outputs output light OUT which is obtained by modulating input light IN. The optical modulator 51 includes optical waveguides 511 and 512, optical multiplexers/demultiplexers 513 and 514, and phase modulation regions PM51_1 to PM51_4 and PM52_1 to PM52_4. The optical waveguides 511 and 512 are arranged in parallel.

The optical multiplexer/demultiplexer 153 is disposed at the optical signal input (input light IN) side of the optical waveguides 511 and 512. At the input side of the optical multiplexer/demultiplexer 513, the input light IN is input to an input port P1, and an input port P2 has no input. At the output side of the optical multiplexer/demultiplexer 513, the optical waveguide 511 is connected to an output port P3 and the optical waveguide 512 is connected to an output port P4.

Figure 2A:
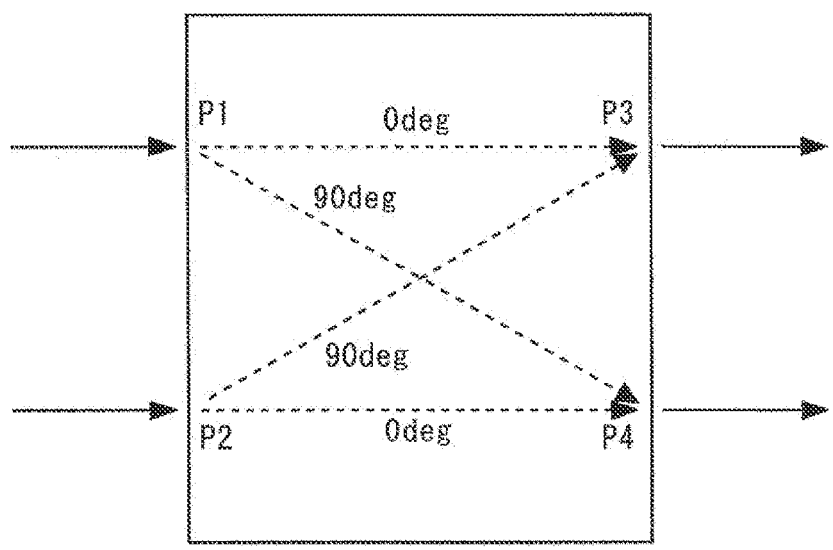
FIG. 2A is a diagram schematically showing a configuration of an optical multiplexer/demultiplexer 513.

FIG. 2A is a diagram schematically showing the configuration of the optical multiplexer/demultiplexer 513. In the optical multiplexer/demultiplexer 513, the light which has entered the input port P propagates to the output ports P3 and P4; however, the light propagating from the input port P1 to the output port P4 has a phase that is delayed by 90° relative to the light propagating from the input port P1 to the output port P3. The light which has entered the input port P2 propagates to the output ports P3 and P4; however, the light propagating from the input port P2 to the output port P3 has a phase that is delayed by 90° relative to the light propagating from the input port P2 to the output port P4.

The optical multiplexer/demultiplexer 514 is disposed at the optical signal output (output light OUT) side of the optical waveguides 511 and 512. At the input side of the optical multiplexer/demultiplexer 514, the optical waveguide 511 is connected to an input port P5 and the optical waveguide 512 is connected to an input port P6. At the output side of the optical multiplexer/demultiplexer 514, the output light OUT is output from an output port P7.

Figure 2B:
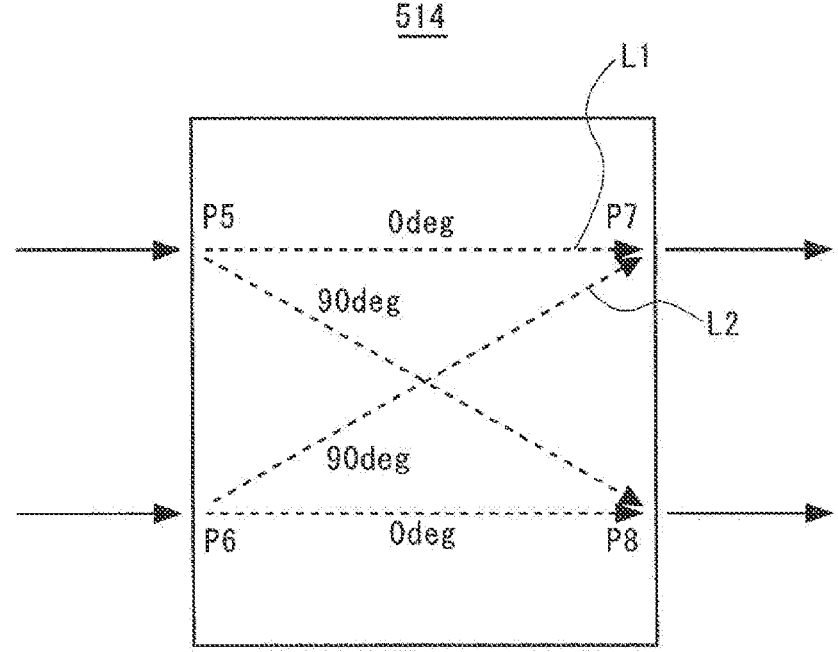
FIG. 2B is a diagram schematically showing a configuration of an optical multiplexer/demultiplexer 514.

FIG. 2B is a diagram schematically showing the configuration of the optical multiplexer/demultiplexer 514. The optical multiplexer/demultiplexer 514 has a configuration similar to that of the optical multiplexer/demultiplexer 513. The input ports P5 and P6 respectively correspond to the input ports P1 and P2 of the optical multiplexer/demultiplexer 513. The output ports P7 and P8 respectively correspond to the output ports P3 and P4 of the optical multiplexer/demultiplexer 513. The light which has entered the input port P5 propagates to the output ports P7 and P8; however, the light propagating from the input port P5 to the output port P8 has a phase that is delayed by 90° relative to the light propagating from the input port P5 to the output port P7. The light which has entered the input port P6 propagates to the output ports P7 and P8; however, the light propagating from the input port P6 to the output port P7 has a phase that is delayed by 90° relative to the light propagating from the input port P6 to the output port P8.

The phase modulation regions PM51_1 to PM51_4 are arranged on the optical waveguide 511 between the optical multiplexer/demultiplexer 513 and the optical multiplexer/demultiplexer 514. The phase modulation regions PM52_1 to PM52_4 are arranged on the optical waveguide 512 between the optical multiplexer/demultiplexer 513 and the optical multiplexer/demultiplexer 514.

The term "phase modulation region" used herein refers to a region including an electrode formed on the optical waveguide. When an electric signal, such as a voltage signal, is applied to the electrode, the effective refractive index of the optical waveguide under the electrode changes. As a result, the substantial optical path length of the optical waveguide of the phase modulation region can be changed. This allows the phase modulation region to change the phase of the optical signal propagating through the optical waveguide. Further, the optical signal can be modulated by applying a phase difference between the optical signals propagating through the two optical waveguides 511 and 512. That is, the optical modulator 51 forms a multilevel Mach-Zehnder optical modulator having two arms and an electrode segmented structure.

The decoder 52 decodes 4-bit input digital signals D[3:0], and outputs, for example, multi-bit signals D1 to D4, to the drive circuit 53.

The drive circuit 53 includes five-value D/A converters DAC51 to DAC54. The D/A converters DAC51 to DAC54 are respectively supplied with the signals D1 to D4. The D/A converters DAC51 to DAC54 output a pair of differential output signals according to the signals D1 to D4, respectively. At this time, the positive-phase output signals of the differential output signals output from the D/A converters DAC51 to DAC54 are respectively output to the phase modulation regions PM51_1 to PM51_4. The negative-phase output signals of the differential output signals output from the D/A converters DAC51 to DAC54 are respectively output to the phase modulation regions PM52_1 to PM52_4.

The differential output signals output from the D/A converters DAC51 to DAC54 will now be described. As mentioned above, the D/A converter DAC51 is a D/A converter which outputs five values (0, 1, 2, 3, and 4). Specifically, the DAC51 increases the value of the positive-phase output signal in the order of "0"→"1"→"2"→"3"→"4" in accordance with an increase in the value of the signal D1.

On the other hand, the DAC51 outputs an inverted signal of the positive-phase output signal as the negative-phase output signal. Specifically, the DAC51 increases the value of the negative-phase output signal in the order of "4"→"3"→"2"→"1"→"0" in accordance with an increase in the value of the signal D1. It can also be understood that the value of the negative-phase output signal is determined so that the sum of the values of the positive-phase output signal and the negative-phase output signal becomes equal to the maximum value "4" of the five output values.

FIG. 3 is an operation table showing operations of the optical transmitter 500. As the value of the input digital signals D[3:0] increases in the order of "0000"→"0001"→"0010"→"0011"→"0100", the D/A converter DAC51 increases the value of the positive-phase output signal in the order of "0"→"1"→"2"→"3"→"4" and decreases the value of the negative-phase output signal in the order of "4"→"3"→"2"→"1"→"0". In this case, however, when the value of the input digital signals D[3:0] is equal to or greater than "0101", the value of the positive-phase output signal of the D/A converter DAC51 is "4" and the value of the negative-phase output signal is "0".

As the value of the input digital signals D[3:0] increases in the order of "0100"→"0101"→"0110"→"0111"→"1000", the D/A converter DAC52 increases the value of the positive-phase output signal in the order of "0"→"1"→"2"→"3"→"4" and decreases the value of the negative-phase output signal in the order of "4"→"3"→"2"→"1"→"0". In this case, however, when the value of the input digital signals D[3:0] is equal to or smaller than "0011", the value of the positive-phase output signal of the D/A converter DAC52 is "0" and the value of the negative-phase output signal is "4". When the value of the input digital signals D[3:0] is equal to or greater than "1001", the value of the positive-phase output signal of the D/A converter DAC52 is "4" and the value of the negative-phase output signal is "0".

As the value of the input digital signals D[3:0] increases in the order of "1000"→"1001"→"1010"→"1011"→"1100", the D/A converter DAC53 increases the value of the positive-phase output signal in the order of "0"→"1"→"2"→"3"→"4" and decreases the value of the negative-phase output signal in the order of "4"→"3"→"2"→"1"→"0". In this case, however, when the value of the input digital signals D[3:0] is equal to or smaller than "0111", the value of the positive-phase output signal of the D/A converter DAC53 is "0" and the value of the negative-phase output signal is "4". When the value of the input digital signals D[3:0] is equal to or greater than "1101", the value of the positive-phase output signal of the D/A converter DAC53 is "4" and the value of the negative-phase output signal is "0".

As the value of the input digital signals D[3:0] increases in the order of "1100"→"1101"→"1110"→"1111", the D/A converter DAC54 increases the value of the positive-phase output signal in the order of "0"→"1"→"2"→"3" and decreases the value of the negative-phase output signal in the order of "4"→"3"→"2"→"1". In this case, however, when the value of the input digital signals D[3:0] is equal to or smaller than "1011", the value of the positive-phase output signal of the D/A converter DAC51 is "0" and the value of the negative-phase output signal is "4".

Figure 4:
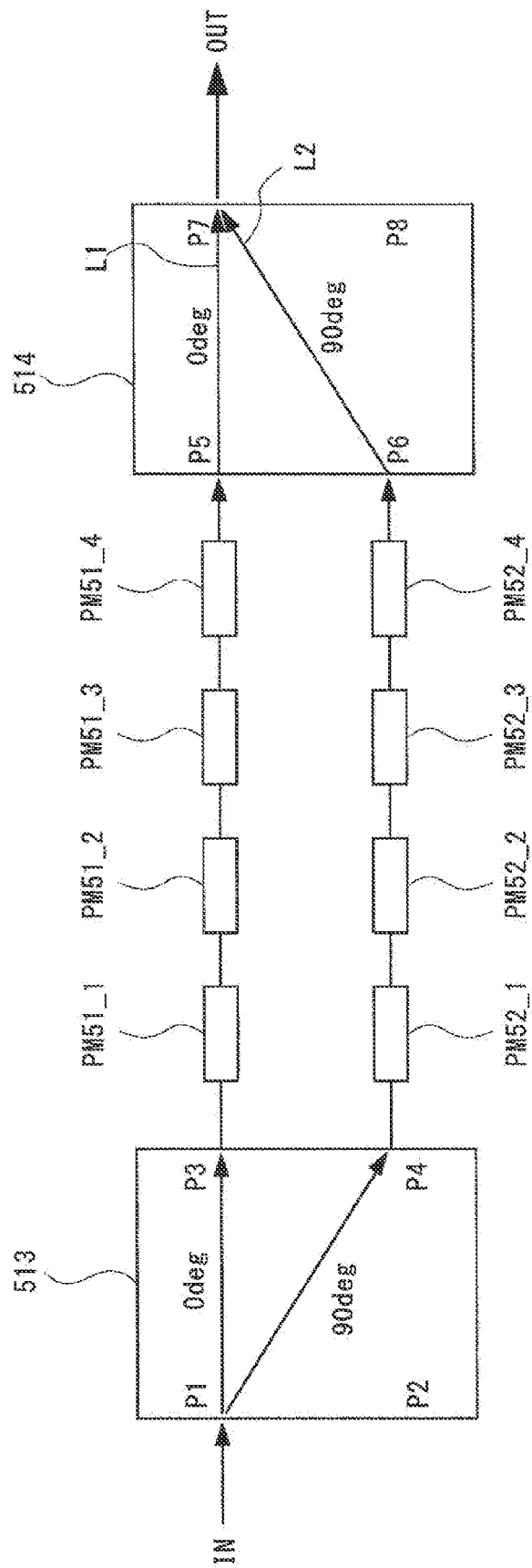
FIG. 4 is a diagram schematically showing a mode in which light propagates in the optical transmitter 500.

The phase modulation operation of the optical transmitter 500 will now be described. FIG. 4 is a diagram schematically showing a mode in which light propagates in the optical transmitter 500. In this example, as shown in FIG. 1, the input light IN is input to the input port P1 of the optical multiplexer/demultiplexer 513. Accordingly, the light output from the output port P4 has a phase that is delayed by 90° relative to the light output from the output port P3. After that, the light output from the output port P3 passes through the phase modulation regions PM51_1 to PM51_4 and reaches the input port P5 of the optical multiplexer/demultiplexer 514. The light which has reached the input port P5 directly reaches the output port P7. On the other hand, the light output from the output port P4 passes through the phase modulation regions PM52_1 to PM52_4 and reaches the input port P6 of the optical multiplexer/demultiplexer 514. The light which has reached the input port P6 has a phase that is further delayed by 90°, and reaches the output port P7.

In other words, light L2 which reaches the output port P7 from the input port P6 has a phase that is delayed by 180° relative to light L1 which reaches the output port P7 from the input port P5, even when the phase modulation regions PM51_1 to PM51_4 and the phase modulation regions PM52_1 to PM52_4 do not perform any phase modulation.

Figure 5A:
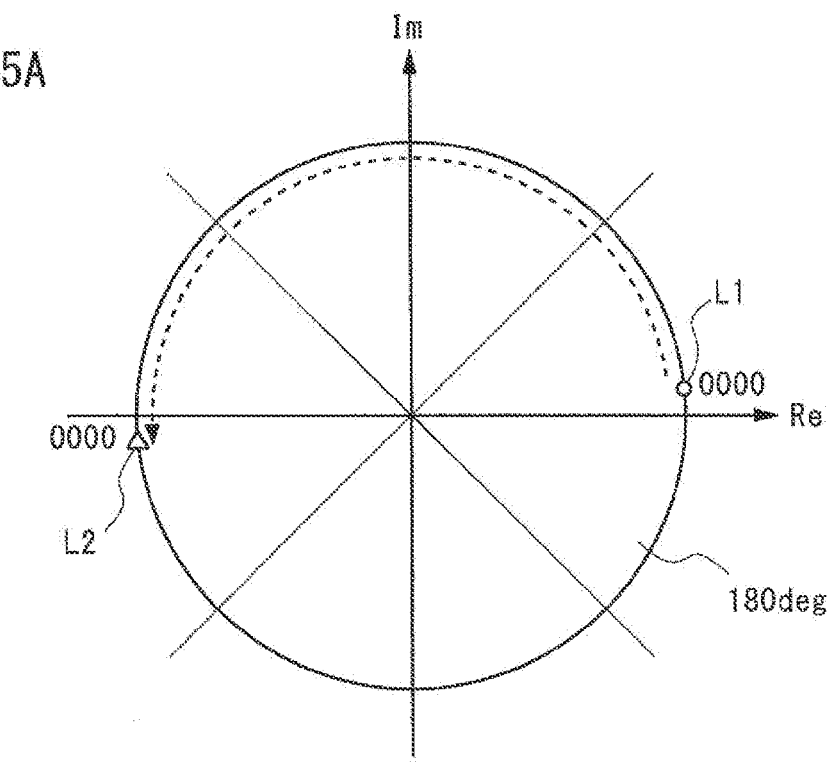
FIG. 5A is a constellation diagram showing light L1 and light L2 which are not subjected to phase modulation by phase modulation regions PM51_1 to PM51_4 and phase modulation regions PM52_1 to PM52_4.

FIG. 5A is a constellation diagram showing the light L and light L2 which are not subjected to phase modulation by the phase modulations regions PM51_1 to PM51_4 and the phase modulation regions PM52_1 to PM52_4. As described above, the light L2 which reaches the output port P7 from the input port P6 is delayed by 180° relative to the light L which reaches the output port P7 from the input port P5.

Figure 5B:
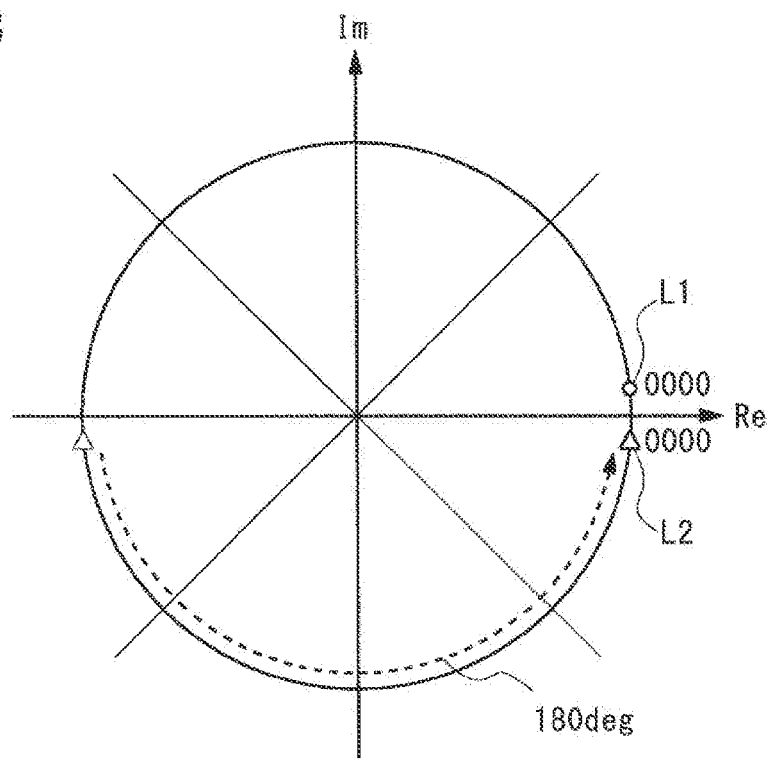
FIG. 5B is a constellation diagram showing the light L1 and light L2 when the binary code of an input digital signal is "0000" in the optical transmitter 500.

Meanwhile, in the optical transmitter 500, the positive-phase output signal is input to each of the phase modulation regions PM51_1 to PM51_4, and the negative-phase output signal is input to each of the phase modulation regions PM52_1 to PM52_4. Accordingly, the phase delay of the light L2 which reaches the output port P7 from the input port P6 is compensated. FIG. 5B is a constellation diagram showing the light L1 and light L2 when the binary code of the input digital signals D[3:0] is "0000" in the optical transmitter 500. For example, when the binary code of the input digital signals D[3:0] is "0000", the positive-phase output signal indicating "0" is input to each of the phase modulation regions PM51_1 to PM51_4, and the negative-phase output signal indicating "4" is input to each of the phase modulation regions PM52_1 to PM52_4. Accordingly, the phase of the light passing through the phase modulation regions PM52_1 to PM52_4 is further delayed by 180°.

That is, the phase delay of 180° generated due to the phase modulation regions PM52_1 to PM52_4, as well as the original phase delay of 180°, is added to the light L2 which reaches the output port P7 from the input port P6. Thus, a phase delay of 360° is generated in the light L2 which reaches the output port P7 from the input port P6, so that the phase delay with respect to the light L1, which reaches the output port P7 from the input port P5, is substantially eliminated. Furthermore, the value of the negative-phase output signal is decreased as the binary code of the input digital signals D[3:0] increases and the value of each of the positive-phase output signals output from the DAC51 to DAC54 increases.

Figure 5C:
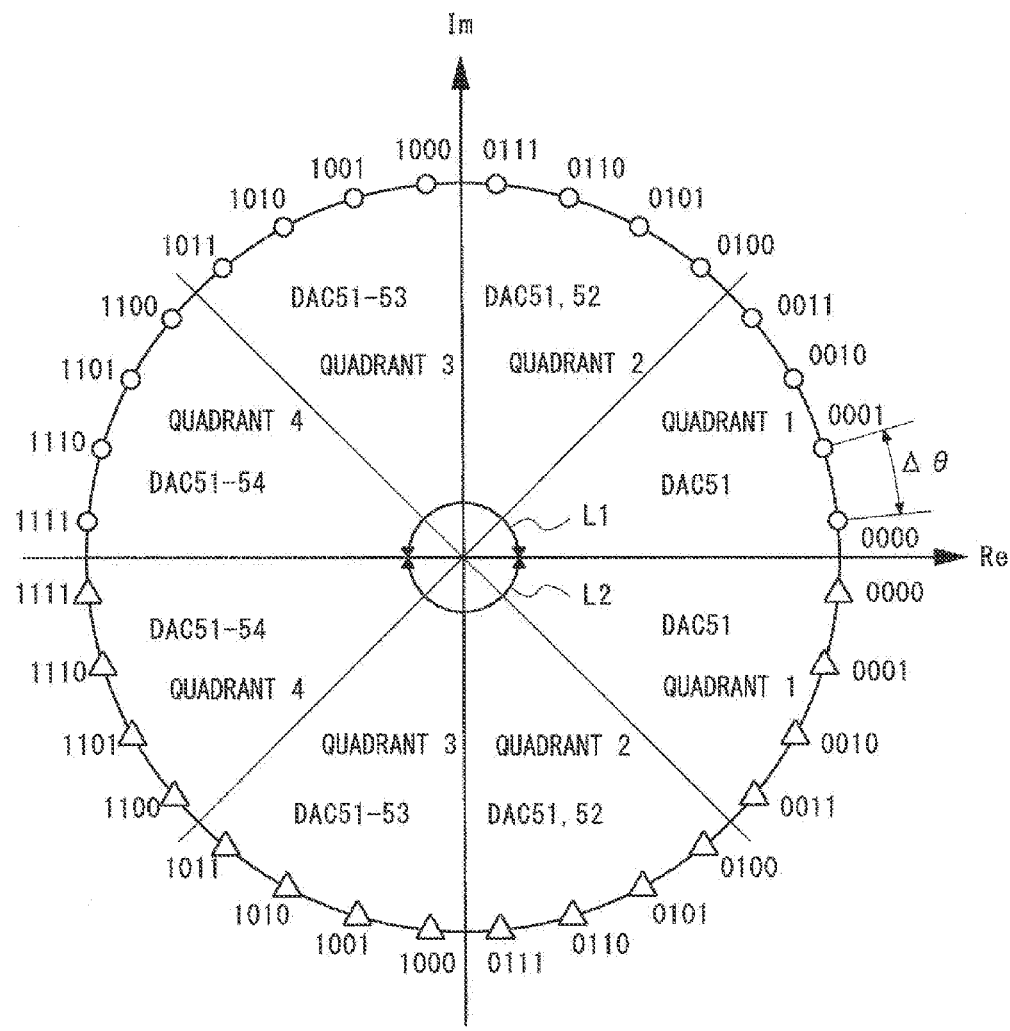
FIG. 5C is a constellation diagram showing the light L1 and light L2 in the optical transmitter 500.

FIG. 5C is a constellation diagram showing the light L1 and light L2 in the optical transmitter 500. As shown in FIG. 5C, when the differential output signals are used, the optical phases of the light L1 and the light L2 change symmetrically with respect to an Re axis, while the phase delay of the light L2, which reaches the output port P4 from the input port P1 and reaches the output port P7 from the input port P6, is compensated according to a change in the input digital signals D[3:0], thereby achieving an optical D/A conversion in the optical transmitter. With this configuration, the amount of phase modulation of the light L1 can be changed in 16 levels, i.e., 0 to 15 Δθ, and the amount of phase modulation of the light L2 can be changed in levels, i.e., 0 to −15 Δθ, according to the value of the input digital signals D[3:0], as shown in the operation table of FIG. 3.

To facilitate understanding of the drawings, FIGS. 5B and 5C illustrate the positions of the light L1 and light L2 so as not to coincide with each other when the binary code of the input digital signals D[3:0] is "0000" or "1111". In other words, when the binary code of the input digital signals D[3:0] is "0000" or "1111", the positions of the light L1 and light L2 may coincide with each other. The case where the amount of variation in the phase that is modulated in the phase modulation regions varies in the range of 0 to 180 degrees according to the input digital signal has been described above, but the amount of phase variation is not limited to this range.

Figure 5D:
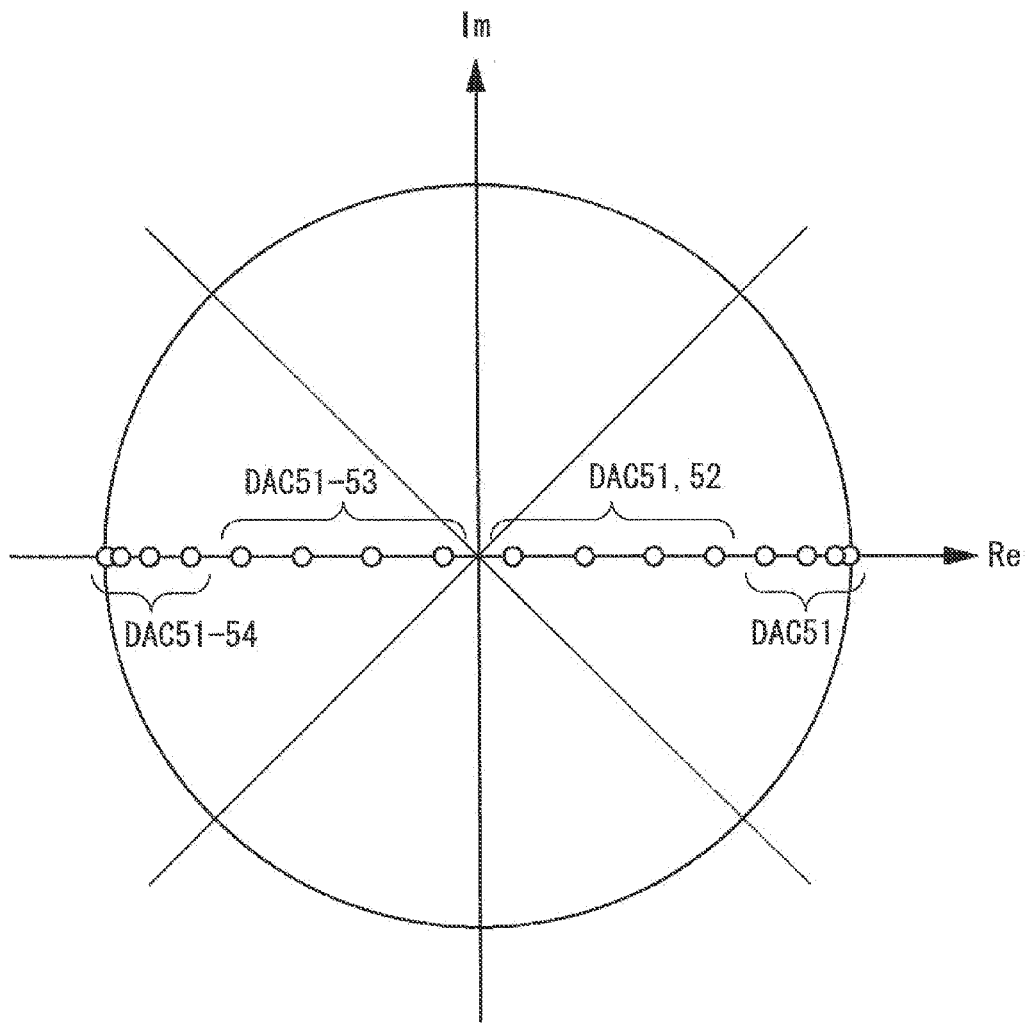
FIG. 5D is a constellation diagram showing the light intensity of output light OUT obtained by multiplexing the light L1 and light L2 in the optical transmitter 500.

The configuration described above allows the optical transmitter to function as a 4-bit optical transmitter. However, if the levels of the phases of the light L1 and light L2, which are subjected to phase modulation by the drive circuit 53, are at regular intervals, the following problem arises. FIG. 5D is a constellation diagram showing the light intensity of the output light OUT obtained by multiplexing the light L1 and light L2 in the optical transmitter 500. As shown in FIG. 5D, when the phase of the optical signal is shifted at regular intervals, the interval between the levels of the light intensity of the output light is not uniform, which makes it difficult to ensure the linearity of the signal intensity of the output light with respect to the input digital signal.

First Exemplary Embodiment

Figure 6:
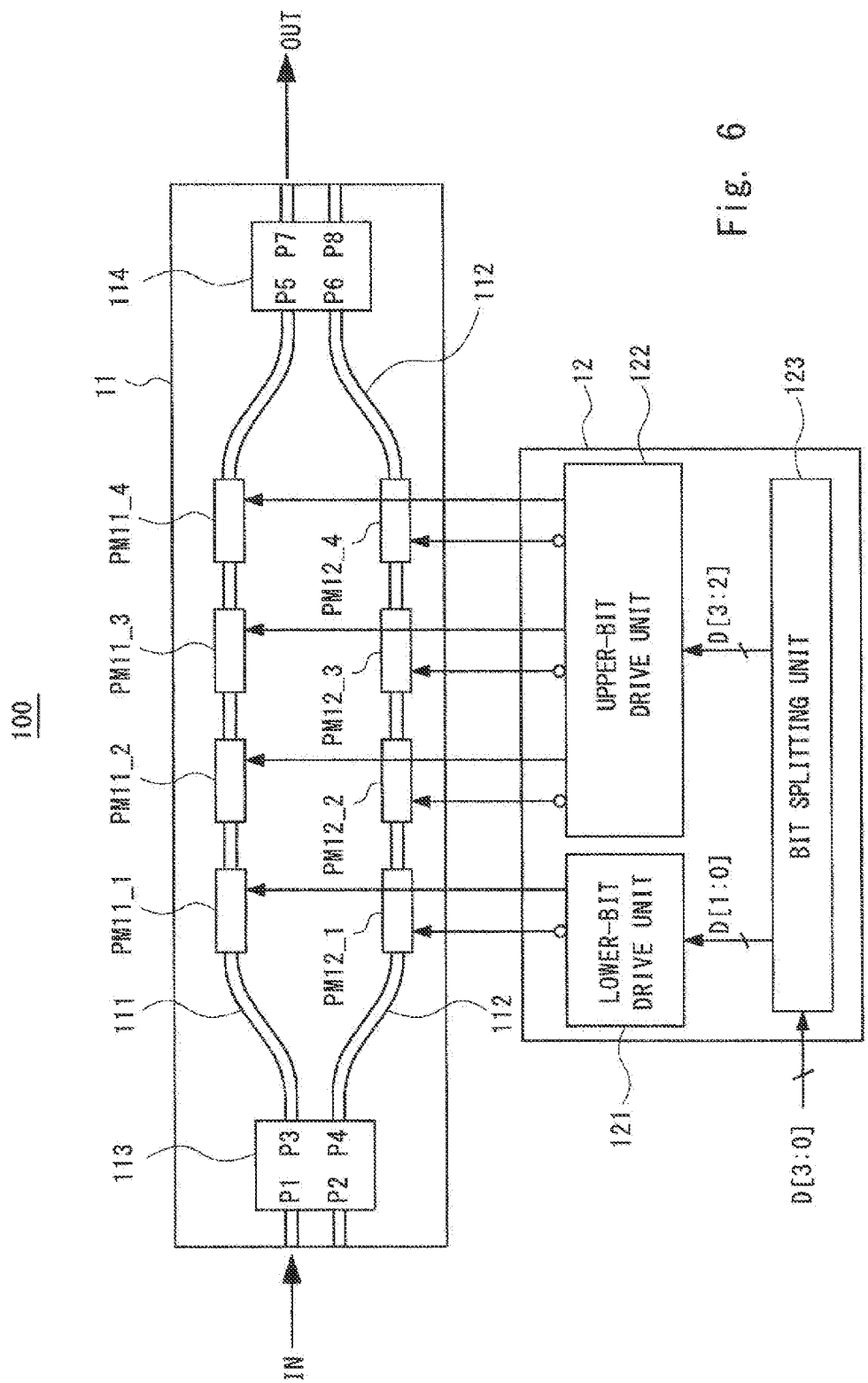
FIG. 6 is a block diagram schematically showing a configuration of an optical transmitter 100 according to a first exemplary embodiment.

First, an optical transmitter 100 according to a first exemplary embodiment of the present invention will be described. The optical transmitter 100 is a multilevel modulation optical transmitter. In this case, however, to simplify the explanation, the optical transmitter 100 will be described as a 4-bit optical transmitter. FIG. 6 is a block diagram schematically showing the configuration of the optical transmitter 100 according to the first exemplary embodiment. The optical transmitter 100 includes an optical modulator 11 and a drive circuit 12.

The optical modulator 11 outputs output light OUT which is obtained by modulating input light IN. The optical modulator 11 includes optical waveguides 111 and 112, optical multiplexers/demultiplexers 113 and 114, and phase modulation regions PM11_1 to PM11_4 and PM12_1 to PM12_4. The optical waveguides 111 and 112 are arranged in parallel.

The optical multiplexer/demultiplexer 113 is disposed at the optical signal input (input light IN) side of the optical waveguides 111 and 112. The optical multiplexer/demultiplexer 113 has a configuration similar to that of the optical multiplexer/demultiplexer 513 described above. At the input side of the optical multiplexer/demultiplexer 113, the input light IN is input to the input port P1, and the input port P2 has no input. At the output side of the optical multiplexer/demultiplexer 113, the optical waveguide Ill is connected to the output port P3 and the optical waveguide 112 is connected to the output port P4.

The optical multiplexer/demultiplexer 114 is disposed at the optical signal output (output light OUT) side of the optical waveguides 111 and 112. The optical multiplexer/demultiplexer 114 has a configuration similar to that of the optical multiplexer/demultiplexer 514 described above. At the input side of the optical multiplexer/demultiplexer 114, the optical waveguide 111 is connected to the input port P5, and the optical waveguide 112 is connected to the input port P6. At the output side of the optical multiplexer/demultiplexer 114, the output light OUT is output from the output port P7.

The phase modulation regions PM11_1 to PM11_4 are arranged on the optical waveguide 111 between the optical multiplexer/demultiplexer 113 and the optical multiplexer/demultiplexer 114. The phase modulation regions PM12_1 to PM12_4 are arranged on the optical waveguide 112 between the optical multiplexer/demultiplexer 113 and the optical multiplexer/demultiplexer 114.

The term "phase modulation region" used herein refers to a region including an electrode formed on the optical waveguide. When an electric signal, such as a voltage signal, is applied to the electrode, the effective refractive index of the optical waveguide under the electrode changes. As a result, the substantial optical path length of the optical waveguide of the phase modulation region can be changed. Accordingly, the phase modulation region can change the phase of the optical signal propagating through the optical waveguide. Further, the optical signal can be modulated by applying a phase difference between the optical signals propagating through the two optical waveguides 111 and 112. That is, the optical modulator 11 forms a multilevel Mach-Zehnder optical modulator having two arms and an electrode segmented structure.

The drive circuit 12 includes a lower-bit drive unit 121, an upper-bit drive unit 122, and a bit splitting unit 123. The bit splitting unit 123 splits the 4-bit input digital signals D[3:0], which are supplied to the drive circuit 12, into upper bits and lower bits. In this case, the bit splitting unit 123 splits the input digital signals D[3:0] into two upper bits D[3:2] and two lower bits D[1:0].

FIG. 7 is an operation table showing operations of the optical transmitter 100 according to the first exemplary embodiment. The lower-bit drive unit 121 is supplied with the lower bits D[1:0]. The lower-bit drive unit 121 outputs a pair of differential output signals according to the value of the lower bits D[0:1]. At this time, the positive-phase output signal of the differential output signals output from the lower-bit drive unit 121 is output to the phase modulation region PM11_1. The negative-phase output signal of the differential output signals output from the lower-bit drive unit 121 is output to the phase modulation region PM12_1.

Specifically, the lower-bit drive unit 121 outputs four values (0, 1, 2, and 3) according to the lower bits D[1:0]. The lower-bit drive unit 121 increases the value of the positive-phase output signal in the order of "0"→"1"→"2"→"3" in accordance with an increase in the value of the lower bits D[1:0].

On the other hand, the lower-bit drive unit 121 outputs an inverted signal of the positive-phase output signal as the negative-phase output signal. Specifically, the lower-bit drive unit 121 decreases the value of the negative-phase output signal in the order of "3"→"2"→"1"→"0" in accordance with an increase in the value of the lower bits D[1:0]. It can also be understood that the value of the negative-phase output signal is determined so that the sum of the values of the positive-phase output signal and the negative-phase output signal becomes equal to the maximum value "3" of the four output values.

The upper-bit drive unit 122 is supplied with the upper bits D[3:2]. The upper-bit drive unit 122 outputs three pairs of differential output signals according to the value of the upper bits D[3:2]. At this time, the positive-phase output signals of the differential output signals output from the upper-bit drive unit 122 are respectively output to the phase modulation regions PM11_2 to PM11_4. The negative-phase output signals of the differential output signals output from the upper-bit drive unit 122 are respectively output to the phase modulation regions PM12_2 to PM12_4. In the upper-bit drive unit 122, the positive-phase output signal and the negative-phase output signal take only the value of "0" or "4". That is, when the positive-phase output signal indicates "0", the negative-phase output signal indicates "4", and when the positive-phase output signal indicates "4", the negative-phase output signal indicates "0".

Specifically, when a most significant bit D[3] and a most significant bit D[2] of the upper bits D[3:2] are "0", the upper-bit drive unit 122 outputs "0" as the positive-phase output signals to the phase modulation regions PM11_2 to PM11_4 and outputs "4" as the negative-phase output signals to the phase modulation regions PM12_2 to PM12_4.

When the most significant bit D[3] of the upper bits D[3:2] is "0" and the most significant bit D[2] thereof is "1", the upper-bit drive unit 122 outputs "4" as the positive-phase output signal to the phase modulation region PM11_2 and outputs "0" as the positive-phase output signals to the phase modulation regions PM11_3 and PM11_4. Further, the upper-bit drive unit 122 outputs "0" as the negative-phase output signal to the phase modulation region PM12_2 and outputs "4" as the negative-phase output signals to the phase modulation regions PM12_3 and PM12_4.

When the most significant bit D[3] of the upper bits D[3:2] is "1" and the most significant bit D[2] thereof is "0", the upper-bit drive unit 122 outputs "4" as the positive-phase output signals to phase modulation regions PM11_2 and PM11_3 and outputs "0" as the positive-phase output signal to the phase modulation region PM11_4. The upper-bit drive unit 122 outputs "0" as the negative-phase output signals to the phase modulation regions PM12_2 and PM12_3 and outputs "4" as the negative-phase output signal to the phase modulation region PM12_4.

When the most significant bit D[3] and the most significant bit D[2] of the upper bits D[3:2] are "1", the upper-bit drive unit 122 outputs "4" as the positive-phase output signals to the phase modulation regions PM11_2 to PM11_4 and outputs "0" as the negative-phase output signals to the phase modulation regions PM12_2 to PM12_4.

That is, the upper-bit drive unit 122 performs a rough control according to the upper bits, whereas the lower-bit drive unit 121 performs a fine control according to the values of the lower bits.

In the optical signals propagating through the same waveguide, the phase modulations induced by the divided phase modulation regions are added. Accordingly, the optical transmitter 100 is driven for the lower bits and the upper bits separately, thereby achieving an optical transmitter capable of large-scale multilevel modulation with a small number of divisions.

In this configuration, a binary driver can be used for multilevel modulation, instead of a multilevel DAC. Therefore, the circuit size of the drive circuit can be reduced as compared with the drive circuit configured using only the multilevel DAC. This results in downsizing of the optical transmitter itself.

When the number of levels of the multilevel modulation is large, it is difficult to add signals such as, especially, electric signals, at a high speed. However, in this configuration, an electric signal is converted into an optical phase and variations of the phase are added, thereby making it possible to perform a high-speed addition operation. Consequently, it is possible to provide an optical transmitter which can be suitably used for high-speed optical communication.

Second Exemplary Embodiment

Figure 8:
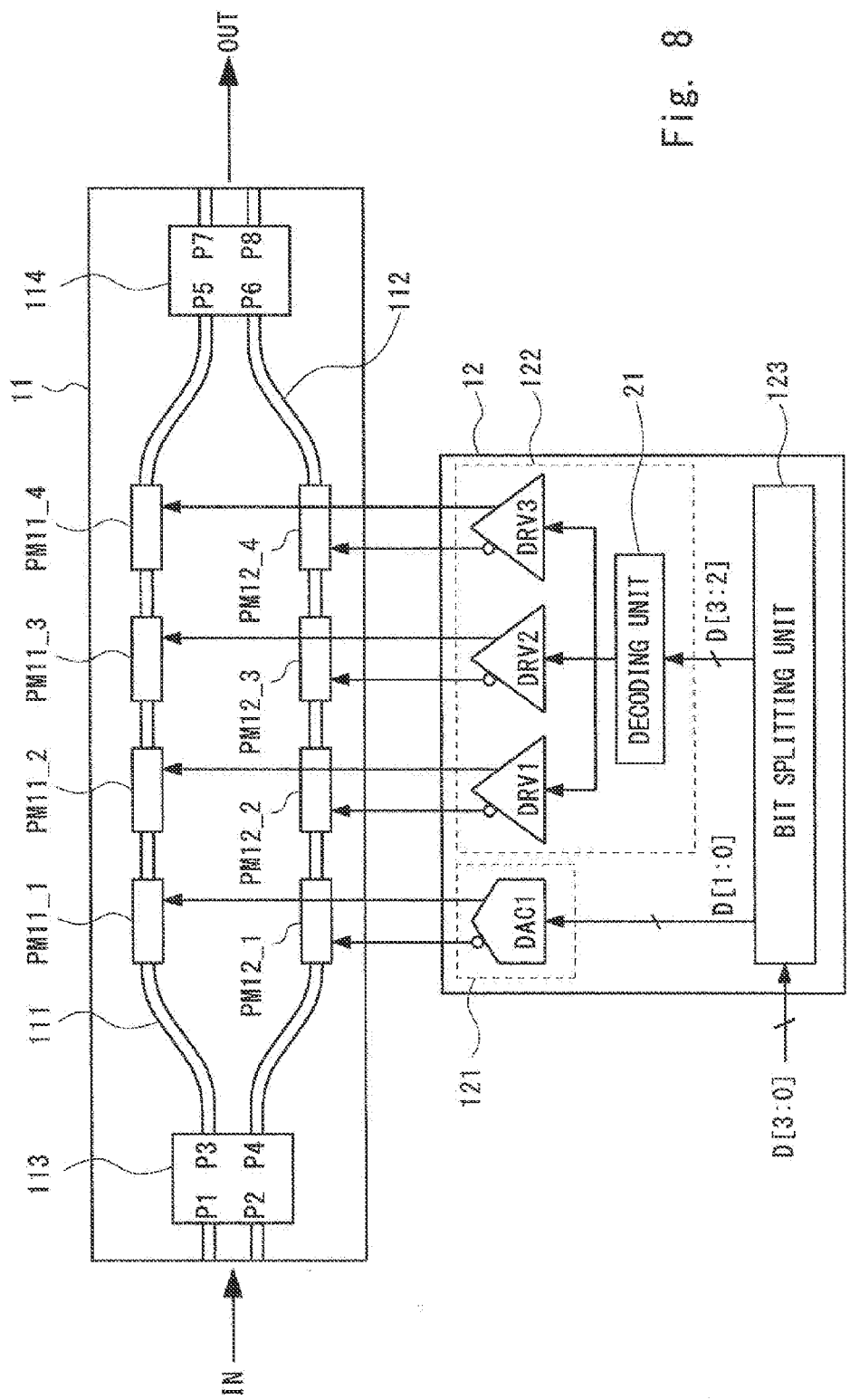
FIG. 8 is a block diagram schematically showing a configuration of an optical transmitter 200 according to a second exemplary embodiment.

Next, an optical transmitter 200 according to a second exemplary embodiment of the present invention will be described. The optical transmitter 200 is a specific example of the optical transmitter 100 according to the first exemplary embodiment. FIG. 8 is a block diagram schematically showing the configuration of the optical transmitter 200 according to the second exemplary embodiment.

The lower-bit drive unit 121 includes a four-value D/A converter DAC1 which is supplied with the lower bits D[1:0]. As shown in FIG. 7, the D/A converter DAC1 outputs a positive-phase output signal to the phase modulation region PM11_1 and outputs a negative-phase output signal to the phase modulation region PM12_1 according to the lower bits D[1:0].

The upper-bit drive unit 122 includes a decoding unit 21 and binary drivers DRV1 to DRV3. The decoding unit 21 converts the upper bits D[3:2] from a binary code to a thermometer code. The decoding unit 21 sequentially drives the drivers DRV1 to DRV3 in accordance with an increase in the thermometer code. The drivers DRV1 to DRV3 output differential output signals according to the value of the upper bits D[3:2]. At this time, the positive-phase output signals output from the drivers DRV1 to DRV3 are respectively output to the phase modulation regions PM11_2 to PM11_4, and the negative-phase output signals are respectively output to the phase modulation regions PM12_2 to PM12_4. The positive-phase output signal and negative-phase output signal output from each of the drivers DRV1 to DRV3 take only the value of "0" or "4", as in the first exemplary embodiment. That is, when the positive-phase output signal indicates "0", the negative-phase output signal indicates "4", and when the positive-phase output signal indicates "4", the negative-phase output signal indicates "0".

Specifically, when the most significant bit D[3] and the most significant bit D[2] of the upper bits D[3:2] are "0", the drivers DRV1 to DRV3 output "0" as the positive-phase output signals to the phase modulation regions PM11_2 to PM11_4, respectively. The drivers DRV1 to DRV3 output "4" as the negative-phase output signals to the phase modulation regions PM12_2 to PM12_4, respectively.

When the most significant bit D[3] of the upper bits D[3:2] is "0" and the most significant bit D[2] thereof is "1", the driver DRV1 outputs "4" as the positive-phase output signal to the phase modulation region PM11_2, and outputs "0" as the negative-phase output signal to the phase modulation region PM12_2. The drivers DRV2 and DRV3 output "0" as the positive-phase output signals to the phase modulation regions PM11_3 and PM11_4, respectively, and output "4" as the negative-phase output signals to the phase modulation regions PM12_3 and PM12_4, respectively.

When the most significant bit D[3] of the upper bits D[3:2] is "1" and the most significant bit D[2] thereof is "0", the drivers DRV1 and DRV2 output "4" as the positive-phase output signals to the phase modulation regions PM11_2 and PM11_3, respectively, and output "0" as the negative-phase output signals to the phase modulation regions PM12_2 and PM12_3, respectively. The driver DRV3 outputs "0" as the positive-phase output signal to the phase modulation region PM11_4 and outputs "4" as the negative-phase output signal to the phase modulation region PM12_4.

When the most significant bit D[3] and the most significant bit D[2] of the upper bits D[3:2] are "1", the drivers DRV1 to DRV3 output "4" as the positive-phase output signals to the phase modulation regions PM11_2 to PM11_4, respectively. The drivers DRV1 to DRV3 output "0" as the negative-phase output signals to the phase modulation regions PM12_2 to PM12_4, respectively.

Therefore, according to this configuration, the optical transmitter capable of performing an operation similar to that of the optical transmitter 100 according to the first exemplary embodiment can be specifically achieved.

While the 4-bit optical transmitter has been described in this exemplary embodiment, this configuration can be understood by generalizing the configuration as follows. Assuming that the upper bits are m (m is an integer equal to or greater than 1) bits and the lower bits are n (n is an integer equal to or greater than 2) bits, the input digital signal is represented by (m+n) bits. Accordingly, the D/A converter DAC1 of the lower-bit drive unit outputs $2^n$-level signals ("0" to "$2^n-1$") which are obtained by performing D/A conversion on an n-bit signal.

The upper-bit drive unit includes ($2^m-1$) drivers. The ($2^m-1$) drivers output, to different phase modulation regions, values greater than a maximum value of a driving signal, which is output from the lower-bit drive unit, according to the value of an m-bit signal. Specifically, the ($2^m-1$) drivers output "0" when the value of the m bits is 0. Among the ($2^m-1$) drivers, the number of drivers that output "$2^n$", which is greater by 1 than the maximum value "$2^n-1$" of the driving signal output from the lower-bit drive unit, is increased by 1 as the value of the m bits is increased by 1.

Third Exemplary Embodiment

Next, an optical transmitter 300 according to a third exemplary embodiment of the present invention will be described. The optical transmitter 300 is a modified example of the optical transmitter 100 according to the first exemplary embodiment and the optical transmitter 200 according to the second exemplary embodiment. FIG. 9 is a block diagram schematically showing the configuration of the optical transmitter 300 according to the third exemplary embodiment. The optical transmitter 300 includes an optical modulator 31 and a drive circuit 32. The optical modulator 31 and the drive circuit 32 respectively correspond to the optical modulator 11 and the drive circuit 12 of the optical transmitters 100 and 200. The optical transmitter 300 is configured as a 5-bit optical transmitter.

The optical modulator 31 includes the optical waveguides 111 and 112, the optical multiplexers/demultiplexers 113 and 114, and phase modulation regions PM31_1 to PM31_3 and PM32_1 to 32_3. The phase modulation regions PM31_1 to PM31_3 are arranged on the optical waveguide 11 between the optical multiplexer/demultiplexer 113 and the optical multiplexer/demultiplexer 114. The phase modulation regions PM32_1 to PM32_3 are arranged on the optical waveguide 112 between the optical multiplexer/demultiplexer 113 and the optical multiplexer/demultiplexer 114. The other components of the optical modulator 31 are similar to those of the optical modulator 11, and so the description thereof is omitted.

The drive circuit 32 includes the lower-bit drive unit 121, an upper-bit drive unit 322, and a bit splitting unit 323. The bit splitting unit 323 splits 5-bit input digital signals D[4:0], which are supplied to the drive circuit 32, into upper bits and lower bits. In this case, the bit splitting unit 323 splits the input digital signals D[4:0] into three upper bits D[4:2] and two lower bits D[1:0].

The lower-bit drive unit 121 is similar to that of the second exemplary embodiment, and so the description thereof is omitted.

The upper-bit drive unit 322 is supplied with the upper bits D[4:2]. The upper-bit drive unit 322 includes a bit splitting unit 324, a four-value D/A converter DAC2, and a binary driver DRV4. The bit splitting unit 324 splits the upper bits D[4:2] into a most significant bit D[4] and lower bits D[3:2]. The lower bits D[3:2] are supplied to the D/A converter DAC2, and the most significant bit D[4] is supplied to the driver DRV4.

FIG. 10 is an operation table showing operations of the optical transmitter 300. The lower-bit drive unit 121 repeatedly outputs values in the order of "0"→"1"→"2"→"3"→"0" . . . in accordance with an increase in the value of the input digital signal, as in the first and second exemplary embodiments.

The D/A converter DAC2 of the upper-bit drive unit 322 outputs a positive-phase output signal to the phase modulation region PM31_2 and outputs a negative-phase output signal to the phase modulation region PM32_2, according to the value of the lower bits D[3:2]. The positive-phase output signal and negative-phase output signal output from the D/A converter DAC2 take one of the values "0", "4", "8", and "12". Specifically, when the positive-phase output signal indicates "0", the negative-phase output signal takes "12"; when the positive-phase output signal indicates "4", the negative-phase output signal takes "8"; when the positive-phase output signal indicates "8", the negative-phase output signal takes "4"; and when the positive-phase output signal indicates "12", the negative-phase output signal takes "0". It can also be understood that the value of the negative-phase output signal is determined so that the sum of the positive-phase output signal and the negative-phase output signal becomes equal to the maximum value "12".

When the most significant bit D[4] is "0", the driver DRV4 of the upper-bit drive unit 322 outputs "0" as the positive-phase output signal to the phase modulation region PM31_3, and outputs "16" as the negative-phase output signal to the phase modulation region PM32_3. On the other hand, when the most significant bit D[4] is "1", the driver DRV4 outputs "16" as the positive-phase output signal to the phase modulation region PM31_3, and outputs "0" as the negative-phase output signal to the phase modulation region PM32_3.

That is, as in the first and second embodiments, the lower-bit drive unit 121 (D/A converter DAC1) repeatedly outputs values in the order of "0"→"1"→"2"→"3"→"0" . . . in accordance with an increase in the value of the input digital signal. Thus, the lower-bit drive unit 121 performs a fine control according to the values of the lower bits.

In the upper-bit drive unit 322, the driver DRV4 performs a first rough control according to the most significant bit. Further, the D/A converter DAC2 performs a second rough control which is finer than the first rough control.

In other words, in the optical transmitter 300, the upper-bit drive unit is capable of performing a rough control according to the upper bits and the lower-bit drive unit is capable of performing a fine control according to the values of lower bits, as in the optical transmitters 100 and 200.

In the optical transmitter 300, the number of phase modulation regions, i.e., segmented electrodes, can be reduced as compared with the optical transmitters 100 and 200. This is advantageous in downsizing the optical transmitter. Moreover, the optical transmitter can perform a modulation at more multiple levels than that of the optical transmitters 100 and 200, even though the number of phase modulation regions (segmented electrodes) is reduced. Consequently, a compact optical transmitter capable of performing a modulation at more multiple levels can be achieved.

While the 4-bit optical transmitter has been described in this exemplary embodiment, this configuration can be understood by generalizing the configuration as follows. Assuming that the upper bits are m (m is an integer equal to or greater than 1) bits and the lower bits are n (n is an integer equal to or greater than 2) bits, the input digital signal is represented by (m+n) bits. Accordingly, the D/A converter DAC1 of the lower-bit drive unit outputs $2^n$-level signals ("0" to "$2^n-1$") which are obtained by performing D/A conversion on an n-bit signal.

The upper-bit drive unit includes one driver. The one driver outputs a value greater than a maximum value of a driving signal, which is output from the lower-bit drive unit, according to the value of the m-bit signal. Specifically, when the most significant bit of the upper bits (m-bit signal) is "0", the driver outputs "0", and when the most significant bit is "1", the driver outputs "$2^{(n+m-1)}$".

The upper-bit drive unit includes one D/A converter. The one D/A converter outputs a value obtained by multiplying a value, which is obtained by performing D/A conversion on a value indicated by a bit of the upper bits (m-bit signal) other than the most significant bit, by "$2^n$".

Fourth Exemplary Embodiment

Figure 11:
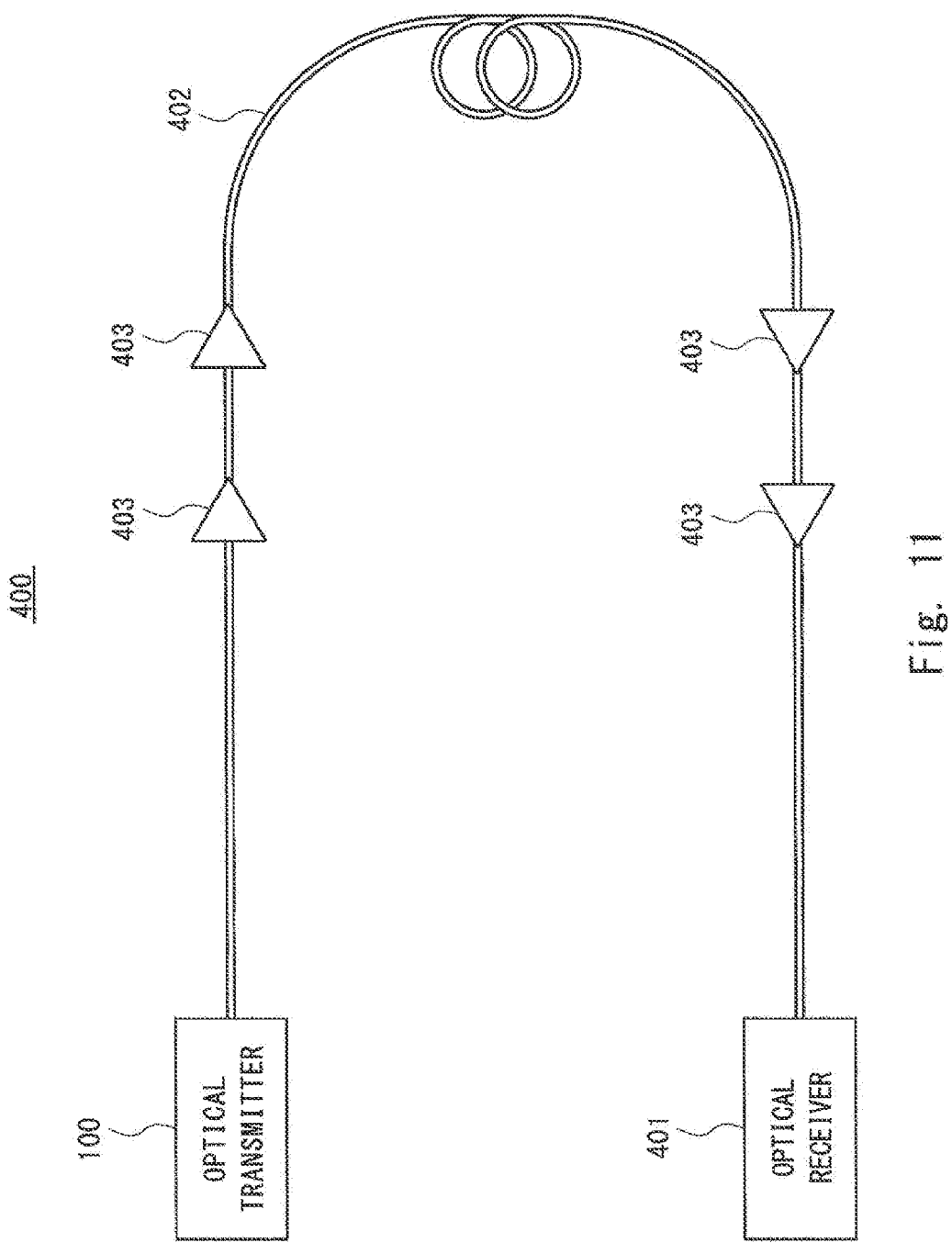
FIG. 11 is a block diagram schematically showing a configuration of an optical transmission/reception system 400 according to a fourth exemplary embodiment.

Next, an optical transmission/reception system 400 according to a fourth exemplary embodiment of the present invention will be described. The optical transmission/reception system 400 is an optical transmission/reception system using one of the above-described optical transmitters 100, 200, and 300. An example in which the optical transmission/reception system 400 includes the optical transmitter 100 will now be described. FIG. 11 is a block diagram schematically showing the configuration of the optical transmission/reception system according to the fourth exemplary embodiment.

The optical transmission/reception system 400 includes the optical transmitter 100, an optical receiver 401, an optical transmission line 402, and optical amplifiers 403.

The optical transmitter 100 outputs, as an optical signal, a QPSK optical signal which is obtained by performing, for example, quadrature phase shift keying (hereinafter referred to as "QPSK").

The optical transmitter 100 and the optical receiver 401 are optically connected via the optical transmission line 402, and the QPSK optical signal propagates therethrough. The optical amplifiers are disposed on the optical transmission line 402, and amplify the QPSK optical signal propagating through the optical transmission line 402. The optical receiver 401 demodulates the QPSK optical signal into an electric signal.

The configuration described above allows the optical transmission/reception system 400 to transmit the optical signal by using the optical transmitter 100. The optical transmitter 100 can be replaced by the optical transmitter 200 or 300, as a matter of course.

Other Exemplary Embodiment

The present invention is not limited to the above exemplary embodiments, and can be modified as appropriate without departing from the scope of the invention. For example, since the optical phase variations can be added regardless of the order of variations, the locations of the lower-bit drive unit and the upper-bit drive unit can be replaced. Also, the order of locations of the D/A converters and drivers within the upper-bit drive unit can be arbitrarily changed.

In the above exemplary embodiments, the optical transmitters 100 and 200 are described as 4-bit optical transmitters and the optical transmitter 300 is described as a 5-bit optical transmitter, but these are illustrated by way of example only. That is, an optical transmitter capable of higher-order multi-level modulation can be configured by increasing the number of phase modulation regions (segmented electrodes), the number of D/A converters, and the number of levels.

The above exemplary embodiments illustrate an example in which differential output signals are supplied to the phase modulation regions, but this is illustrated by way of example only. For example, the value to be input to one of a pair of phase modulation regions may be fixed, and only the value to be input to the other phase modulation region may be changed.

While the present invention has been described with reference to exemplary embodiments, the present invention is not limited to the above-described exemplary embodiments. The configuration and details of the present invention can be modified in various manners which can be understood by those skilled in the art within the scope of the invention.

This application is based upon and claims the benefit of priority from Japanese patent application No. 2012-064767, filed on Mar. 22, 2012, the disclosure of which is incorporated herein in its entirety by reference.

REFERENCE SIGNS LIST 11, 31 OPTICAL MODULATORS
12, 32 DRIVE CIRCUITS
21 DECODING UNIT
100, 200, 300, 500 OPTICAL TRANSMITTERS
111, 112, 511, 512 OPTICAL WAVEGUIDES
113, 114, 513, 514 OPTICAL MULTIPLEXERS/DEMULTIPLEXERS
121 LOWER-BIT DRIVE UNIT
122, 322 UPPER-BIT DRIVE UNITS
123, 323, 324 BIT SPLITTING UNITS
400 OPTICAL TRANSMISSION/RECEPTION SYSTEM
401 OPTICAL RECEIVER
402 TRANSMISSION LINE
403 OPTICAL AMPLIFIER
DAC1, DAC2, DAC51-DAC54 D/A CONVERTERS
DRV1-DRV4 DRIVERS
L1, L2 LIGHT
P1, P2, P6, P7 INPUT PORTS
P3, P4, P7, P8 OUTPUT PORTS
PM11_1-PM11_4, PM12_1-PM12_4, PM31_1-PM31_3, PM32_1-PM32_3, PM51_1-51_4, PM52_1-52_4 PHASE MODULATION REGIONS

The invention claimed is:

1. An optical transmitter comprising:
an optical modulator including an optical transmission line through which an optical signal propagates, a plurality of phase modulation regions being formed on the optical transmission line; and
a drive circuit that outputs a driving signal to each of the plurality of phase modulation regions according to an input digital signal, wherein
the drive circuit includes:
 a bit splitting unit that splits the input digital signal into upper bits and lower bits;
 a lower-bit drive unit that outputs, as a driving signal, a value obtained by performing D/A conversion on the lower bits, to a first phase modulation region of the plurality of modulation regions; and
 an upper-bit drive unit that outputs, to a phase modulation region different from the first phase modulation region, a value greater than a maximum value of the driving signal output from the lower-bit drive unit, or a minimum value of the driving signal output from the lower-bit drive unit, as a driving signal, according to a value of the upper bits,
 wherein the lower-bit drive unit includes a $2^n$ (n is an integer equal to or greater than 2)-level first DAC that performs D/A conversion on an n-bit signal, the n bits being the lower bits.

2. The optical transmitter according to claim 1, wherein
the maximum value of the driving signal output from the lower-bit drive unit is "0", and
the maximum value of the driving signal output from the lower-bit drive unit is "$2^n-1$".

3. The optical transmitter according to claim 2, wherein the upper-bit drive unit includes ($2^m-1$ (m is an integer equal to or greater than 1)) drivers that output, to different phase modulation regions, the value greater than the maximum value of the driving signal output from the lower-bit drive unit, according to a value of an m-bit signal, the m bits being the upper bits.

4. The optical transmitter according to claim 3, wherein
when the value of the m bits is 0, the ($2^m-1$) drivers output "0", and
among the ($2^m-1$) drivers, the number of drivers that output the value greater than the maximum value of the driving signal output from the lower-bit drive unit is increased by 1 as the value of the m bits is increased by 1.

5. The optical transmitter according to claim 4, wherein the value greater than the maximum value of the driving signal output from the lower-bit drive unit is "$2^m$".

6. The optical transmitter according to claim 2, wherein the upper-bit drive unit includes:
a driver that outputs, to a second phase modulation region different from the first phase modulation region, "0" when a most significant bit of m (m is an integer equal to or greater than 1) bits is "0", and outputs, to the second phase modulation region, "$2^{(m+n-1)}$" when the most significant bit is "1", the m bits being the upper bits; and
a second DAC that outputs, to a third phase modulation region different from the first and second phase modulation regions, a value obtained by multiplying a value obtained by performing D/A conversion on a value indicated by a bit of the m-bit signal other than the most significant bit, by "$2^n$".

7. An optical transmission/reception system comprising:
an optical transmitter that sends an optical signal;
a transmission line through which the optical signal propagates; and
an optical receiver that receives the optical signal via the transmission line, wherein
the optical transmitter includes:
an optical modulator including an optical transmission line through which an optical signal propagates, a plurality of phase modulation regions being formed on the optical transmission line; and
a drive circuit that outputs a driving signal to each of the plurality of phase modulation regions according to an input digital signal, and
the drive circuit includes:
a bit splitting unit that splits the input digital signal into upper bits and lower bits;
a lower-bit drive unit that outputs, as a driving signal, a value obtained by performing D/A conversion on the lower bits, to a first phase modulation region of the plurality of modulation regions; and
an upper-bit drive unit that outputs, to a phase modulation region different from the first phase modulation region, a value greater than a maximum value of the driving signal output from the lower-bit drive unit, or a minimum value of the driving signal output from the lower-bit drive unit, as a driving signal, according to a value of the upper bits,
wherein the lower-bit drive unit includes a $2^n$ (n is an integer equal to or greater than 2)-level first DAC that performs D/A conversion on an n-bit signal, the n bits being the lower bits.

8. The optical transmission/reception system according to claim 7, wherein
the minimum value of the driving signal output from the lower-bit drive unit is "0", and
the maximum value of the driving signal output from the lower-bit drive unit is "$2^n-1$".

9. The optical transmission/reception system according to claim 8, wherein the upper-bit drive unit includes ($2^m-1$ (m is an integer equal to or greater than 1)) drivers that output, to different phase modulation regions, the value greater than the maximum value of the driving signal output from the lower-bit drive unit, according to a value of an m-bit signal, the m bits being the upper bits.

10. The optical transmission/reception system according to claim 9, wherein
when the value of the m bits is 0, the ($2^m-1$) drivers output "0", and
among the ($2^m-1$) drivers, the number of drivers that output the value greater than the maximum value of the driving signal output from the lower-bit drive unit is increased by 1 as the value of the m bits is increased by 1.

11. The optical transmission/reception system according to claim 10, wherein the value greater than the maximum value of the driving signal output from the lower-bit drive unit is "$2^n$".

12. The optical transmission/reception system according to claim 8, wherein the upper-bit drive unit includes:
a driver that outputs, to a second phase modulation region different from the first phase modulation region, "0" when a most significant bit of m (m is an integer equal to or greater than 1) bits is "0", and outputs, to the second phase modulation region, "$2^{(m+n-1)}$" when the most significant bit is "1", the m bits being the upper bits; and
a second DAC that outputs, to a third phase modulation region different from the first and second phase modulation regions, a value obtained by multiplying a value obtained by performing D/A conversion on a value indicated by a bit of the m-bit signal other than the most significant bit, by "$2^n$".

13. A drive circuit comprising:
a bit splitting unit that splits an input digital signal into upper bits and lower bits;
a lower-bit drive unit that outputs, as a driving signal, a value obtained by performing D/A conversion on the lower bits, to a first phase modulation region of a plurality of modulation regions formed on an optical transmission line through which an optical signal propagates, the optical transmission line being formed in an optical modulator; and
an upper-bit drive unit that outputs, to a phase modulation region different from the first phase modulation region, a value greater than a maximum value of the driving signal output from the lower-bit drive unit, or a minimum value of the driving signal output from the lower-bit drive unit, as a driving signal, according to a value of the upper bits,
wherein the lower-bit drive unit includes a $2^n$ (n is an integer equal to or greater than 2)-level first DAC that performs D/A conversion on an n-bit signal, the n bits being the lower bits.

14. The drive circuit according to claim 13, wherein
the minimum value of the driving signal output from the lower-bit drive unit is "0", and
the maximum value of the driving signal output from the lower-bit drive unit is "$2^n-1$".

15. The drive circuit according to claim 14, wherein the upper-bit drive unit includes ($2^m-1$ (m is an integer equal to or greater than 1)) drivers that output, to different phase modulation regions, the value greater than the maximum value of the driving signal output from the lower-bit drive unit, according to a value of an m-bit signal, the m bits being the upper bits.

16. The drive circuit according to claim 15, wherein
when the value of the m bits is 0, the ($2^m-1$) drivers output "0", and
among the ($2^m-1$) drivers, the number of drivers that output the value greater than the maximum value of the driving signal output from the lower-bit drive unit is increased by 1 as the value of the m bits is increased by 1.

17. The drive circuit according to claim 16, wherein the value greater than the maximum value of the driving signal output from the lower-bit drive unit is "$2^n$".

18. The drive circuit according to claim 14, wherein the upper-bit drive unit includes:
a driver that outputs, to a second phase modulation region different from the first phase modulation region, "0" when a most significant bit of m (m is an integer equal to or greater than 1) bits is "0", and outputs, to the second phase modulation region, "$2^{(m+n-1)}$" when the most significant bit is "1", the m bits being the upper bits; and
a second DAC that outputs, to a third phase modulation region different from the first and second phase modulation regions, a value obtained by multiplying a value obtained by performing D/A conversion on a value indicated by a bit of the m-bit signal other than the most significant bit, by "$2^n$".

* * * * *